United States Patent
Guimbretiere

(10) Patent No.: US 6,174,239 B1
(45) Date of Patent: Jan. 16, 2001

(54) TRIPOD SLIDING CONSTANT VELOCITY JOINT

(75) Inventor: Pierre Guimbretiere, Neauphle le Chateau (FR)

(73) Assignee: GKN Automotive AG, Lohmar (DE)

( * ) Notice: Under 35 U.S.C. 154(b), the term of this patent shall be extended for 0 days.

(21) Appl. No.: 09/020,833

(22) Filed: Feb. 9, 1998

(30) Foreign Application Priority Data

Feb. 11, 1997 (FR) .................................................. 97 01575

(51) Int. Cl.$^7$ ....................................................... F16D 3/06
(52) U.S. Cl. .......................... 464/111; 464/120; 464/167; 464/905
(58) Field of Search ..................................... 464/111, 112, 464/120, 122, 139, 141, 142, 167, 904, 905, 906

(56) References Cited

U.S. PATENT DOCUMENTS

| | | | | |
|---|---|---|---|---|
| 4,741,723 | * | 5/1988 | Orain | 464/120 |
| 5,061,223 | * | 10/1991 | Kadota et al. | 464/111 |
| 5,254,038 | * | 10/1993 | Schneider | 464/111 |
| 5,735,745 | * | 4/1998 | Kohara et al. | 464/111 |
| 5,803,814 | * | 9/1998 | Welschof | 464/111 |
| 5,827,121 | * | 10/1998 | Bando et al. | 464/111 |

FOREIGN PATENT DOCUMENTS

| | | | |
|---|---|---|---|
| 0202968 | 4/1986 | (EP) . | |
| 2730773 | 2/1995 | (FR) . | |
| 2199638 | 7/1988 | (GB) . | |
| 2259557 | 3/1993 | (GB) . | |
| 2268789 | * 1/1994 | (GB) | 464/111 |
| 405321942 | * 12/1993 | (JP) | 464/111 |

* cited by examiner

Primary Examiner—Lynne H. Browne
Assistant Examiner—Kenneth Thompson
(74) Attorney, Agent, or Firm—Howard & Howard

(57) ABSTRACT

The joint is of the type in which each arm (3) of the tripod (1) has a spherical bearing surface (4) that cooperates with a cylindrical bore (8) in a one-piece intermediate shoe (7). A series of rolling members (12) is disposed between each side of the shoe and a rolling track (6) of the female member (5) of the joint. The bearing distance (D) between the center (A) of the spherical bearing surface (4) of each arm (3) and the main axis (X—X) of the male member (1) is significantly different from the rolling distance (d) between the main axis (X—X) and the mean plane (P') of the rolling members (12) associated with the same arm.

15 Claims, 5 Drawing Sheets

US 6,174,239 B1

TRIPOD SLIDING CONSTANT VELOCITY JOINT

BACKGROUND OF THE INVENTION

The present invention concerns a tripod sliding constant velocity joint of the type comprising:

- a male member having ternary symmetry about a first main axis and including a hub from which project three arms that each delimit a spherical bearing surface;
- a female member defining three pairs of rolling tracks and having ternary symmetry about a second main axis; and
- for each arm:
    - a one-piece intermediate shoe incorporating a cylindrical bore that cooperates with the spherical bearing surface and has two opposed rolling tracks, and
    - two series of rolling members each of which rolls on a rolling track of the female member and on a rolling track of the shoe.

The invention applies in particular to side drives of automobile vehicles.

When a tripod joint is operating at a break angle, the center of the tripod is known to describe a so-called "offset" orbital movement at a frequency three times the speed of rotation of the joint. Moreover, under the same conditions, each arm is displaced radially relative to the associated rolling tracks of the female member.

To obtain very free sliding of the joint whilst allowing for the above phenomena, FR-A-2 580 751, 2 628 803 and 2 703 416 propose providing each arm with a spherical bearing surface and disposing an intermediate bar and a series of rolling members between each side of the arm and the associated rolling track.

However, when the joint is operating out of alignment, the two phenomena referred to above cause geometrical play to appear in the mechanism and this play is proportional to the break angle of the joint. To mask this play as much as possible, an elastic spreader is used between the two bars associated with each journal in order to press the rolling members at all times against their respective rolling tracks. This spreader is bulky, however, and makes the structure of the joint more complex.

To eliminate the spreader and therefore to simplify the construction of the joint, DE-A-40 24 534 proposes a joint of the type indicated at the start of this description. In a joint of the kind concerned the two bars are replaced by a one-piece intermediate shoe. The radial displacement of the center of the spherical bearing surface associated with each of the arms of the tripod then requires a cylindrical circular bore in the shoe.

This design nevertheless has certain drawbacks. In particular, for each drive direction, only one series of rolling members is operative and there is play due to manufacturing tolerances on the opposite side. Consequently, noise is generated on reversing the rotation direction.

An object of the invention is to eliminate this latter disadvantage in a particularly simple and economic manner.

SUMMARY OF THE INVENTION

To this end, the invention provides a constant velocity joint of the above kind characterized in that the bearing distance between the center of the spherical bearing surface of each arm and the main axis of the male member is significantly different, for each rotation direction of the joint, from the rolling distance between the main axis of the mean plane of the rolling members associated with the same arm and transmitting torque in the direction concerned so that in operation the two series of rolling members are loaded regardless of the direction of the applied torque even when the joint is aligned.

It is particularly advantageous if the bearing distance is significantly greater than the rolling distance. The following important additional advantages are then obtained:

Firstly, the torque transmission lever arm being increased, the contact pressure between the spherical bearing surfaces and the cylindrical bores is reduced. This reduces the risks of indentation and even of binding.

The outward offsetting of the spherical bearing surfaces, exploiting the space made available by eliminating the spreader, frees up space towards the axis of the tripod. This significantly increases the mechanical strength of the area where the arms join to the hub of the tripod, generally subject to the provision of a clearance, such as a bevel, in the radially interior part of the bore in the intermediate shoe.

BRIEF DESCRIPTION OF THE DRAWINGS

Embodiments of the invention will now be described with reference to the appended drawings, in which.

DETAILED DESCRIPTION

Figure 1:
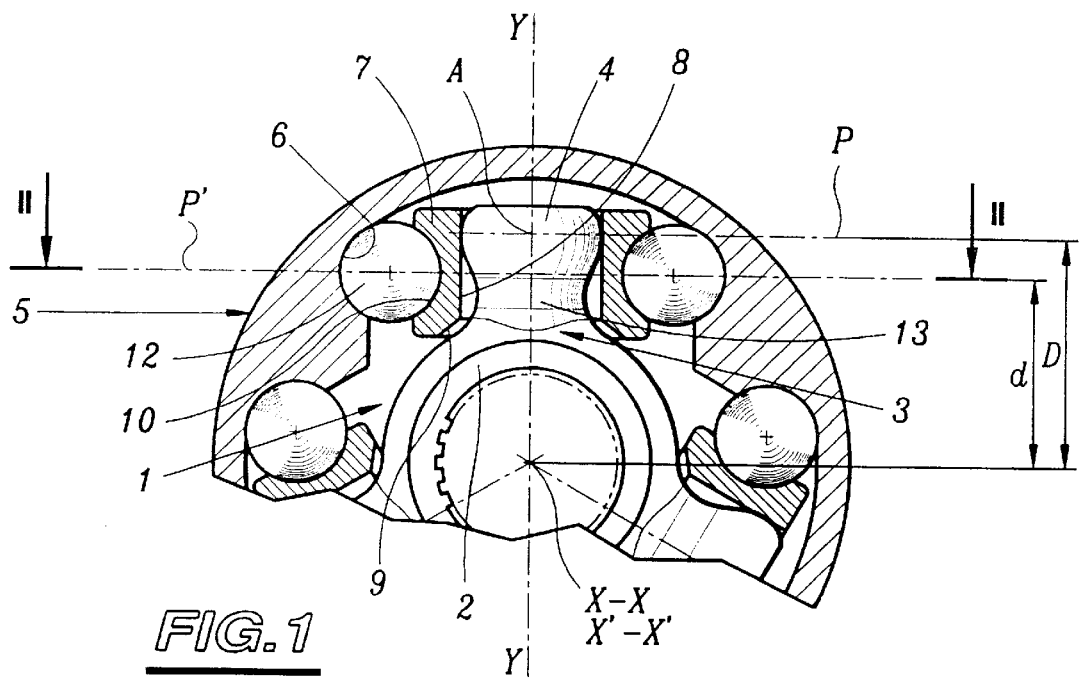
FIG. 1 in a view of a first embodiment of the constant velocity joint of the invention in cross-section taken along the line I—I in FIG. 2.
Figure 2:
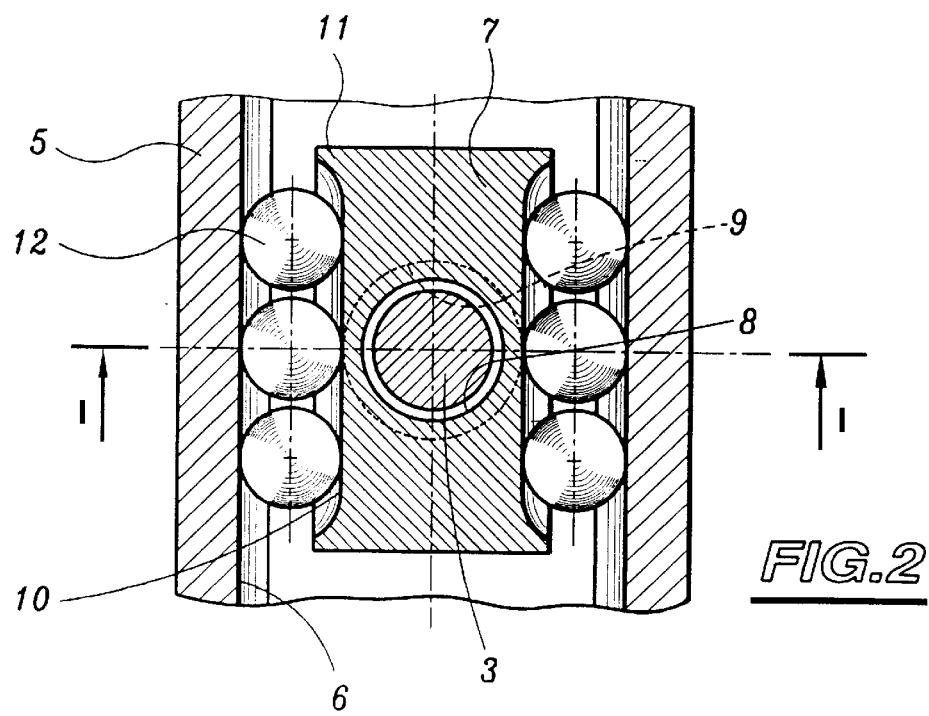
FIG. 2 is a view of the same joint in section taken along the line II—II in FIG. 1.

The constant velocity joint shown in FIGS. 1 and 2, intended for an automobile vehicle final side, comprises the following components:

(1) A tripod 1 that includes an internally splined hub 2 with an axis X—X from which project three radial arms 3 angularly spaced by 120°. The end part of each arm forms an integral spherical bearing surface 4 the equatorial plane P of which intercepts the axis Y—Y of the arm at a point A which is the center of the spherical bearing surface. The distance between the plane P and the central axis X—X is denoted D.

(2) A female member (tulip) 5 the central axis X'—X' of which, in the aligned position of the joint as shown and as referred to the remainder of the description, is coincident with the axis X—X. On respective opposite sides of each arm 3 the tulip has a circular section rolling track 6 with a rectilinear axis parallel to the axis X'—X'. The mean plane P' of the two facing tracks 6, which is the plane defined by their two axes, is parallel to the plane P and is at a distance d from the axis X'—X' that is significantly less than the distance D. By "significantly less" is meant a difference very much greater than that which can result from manufacturing tolerances, for example in the order of several millimeters, typically (D−d)/D=approximately 8% to approximately 30% or d= approximately 0.7 D to approximately 0.92 D.

(3) For each arm 3, a parallelepiped—shaped one-piece intermediate shoe 7. The shoe incorporates a central cylindrical bore 8 that cooperates with the spherical bearing surface 4 of the arm. The radially inner end of the bore 8 incorporates a conical bevel 9 widening towards the axis X—X. The shoe further includes a circular section rolling track 10 along each longer lateral side with the same radius as the tracks 6 and with a rectilinear axis parallel to those of the tracks 6. Each track 10 is delimited at each end by an abutment consisting of a ridge 11 defined by the body of the shoe 7 (FIG. 2).

(4) On each side of each arm 3, a row of identical balls 12 that roll on the tracks 6 and on the tracks 10. These balls move the mean plane of the tracks 10, which is the plane defined by their two axes, into the plane P' defined above.

In operation, the torque applied to the tripod, for example, is transmitted to the shoe 7 with a high lever arm D. The contact pressure between the bearing surface 4 and the bore 8 is therefore relatively low.

Moreover, the force applied to the shoe is cantilevered relative to the mean plane P' of the rolling tracks 6 and 10, which is the mean working plane, or rolling plane, of the two rows of balls. Consequently, the two rows of balls are loaded regardless of the direction of the applied torque, even when the joint is aligned.

As a result, the play due to manufacturing tolerances is absorbed at all times, so that no noise is generated on reversing the direction of the torque.

Note also that offsetting the bearing surface 4 outwards increases the section of the base 13 of the arms, i.e. the part of the arms that joins the bearing surface 4 to the hub 2. This is allowed very simply by the clearance produced by the bevel 9 on the shoe, which does not interfere with the tracks 10.

Figure 3:
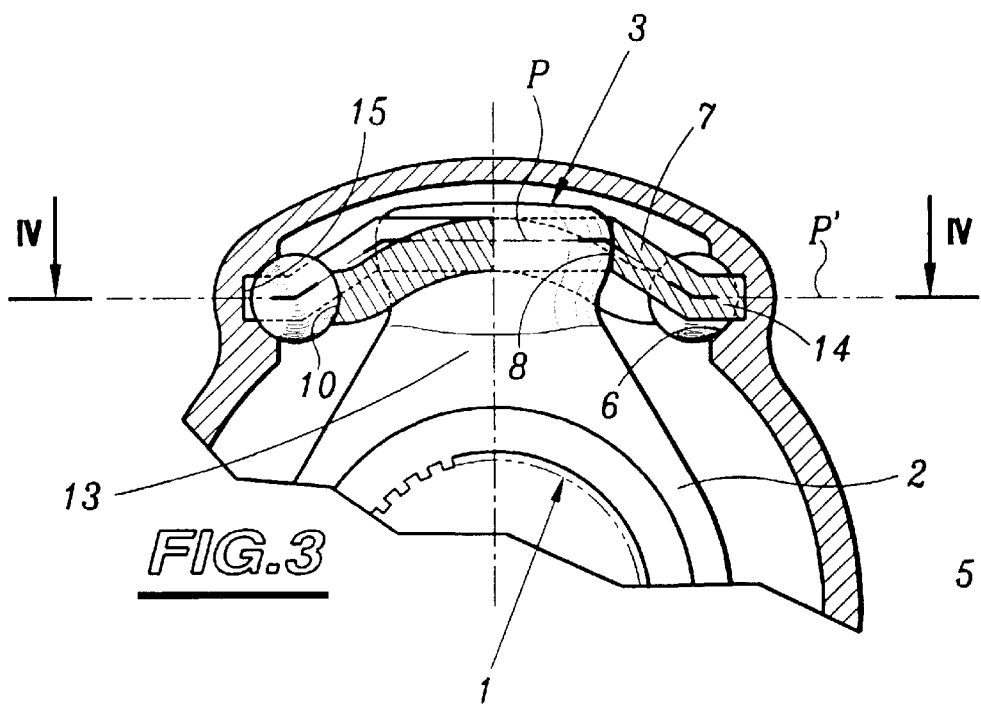
FIG. 3 is a view of a second embodiment of the constant velocity joint of the invention in cross-section taken along the broken line III—III in FIG. 4.
Figure 4:
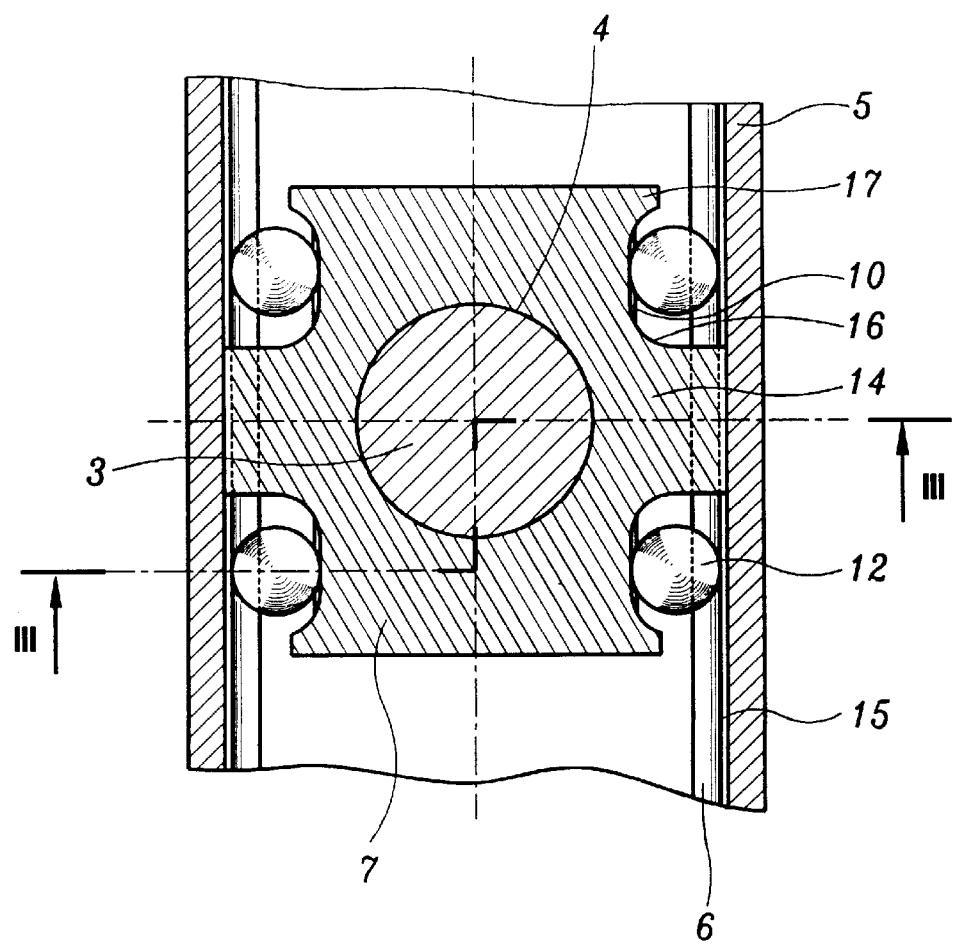
FIG. 4 is a view in section taken along the broken line IV—IV in FIG. 3.

The constant velocity joint shown in FIGS. 3 and 4 differs from the preceding one only in the configuration of the shoe 7. The shoe is formed by a plate having a rectangular shape when seen in plan view (FIG. 4) and the central part of which is domed, with a substantially circular section (FIG. 3). The plate is much thinner than the shoe from FIGS. 1 and 2 and incorporates the cylindrical bore in the form of a central circular orifice. The thickness of the plate is just sufficient for the orifice 8 to cooperate at all times with the bearing surface 4 in the plane P when the joint is operating out of alignment. The longitudinal edges 14 of the plate are bent slightly so as to extend into the aforementioned plane P' and are guided by their intermediate region 14 in rectilinear grooves 15 provided at the bottom of the tracks 6 and centered on the plane P'.

On each side of the region 14 each edge 13 has a notch 16 the bottom of which forms a rolling track 10 and which terminates in a ridge 17. A ball 12 rolls in each notch 16 and in the facing track 6.

The operation and the advantages of a joint of the above kind are the same as those described above with reference to FIGS. 1 and 2. Note, however, that because of the shape of the intermediate shoe, formed by a domed plate, the base 13 of the arms 3 can be made even thicker, as seen clearly in FIG. 3, where the profile of the base is substantially a straight line running from the inner end of the bearing surface 4 and merging tangentially with the outside surface of the hub 2.

Figure 5:
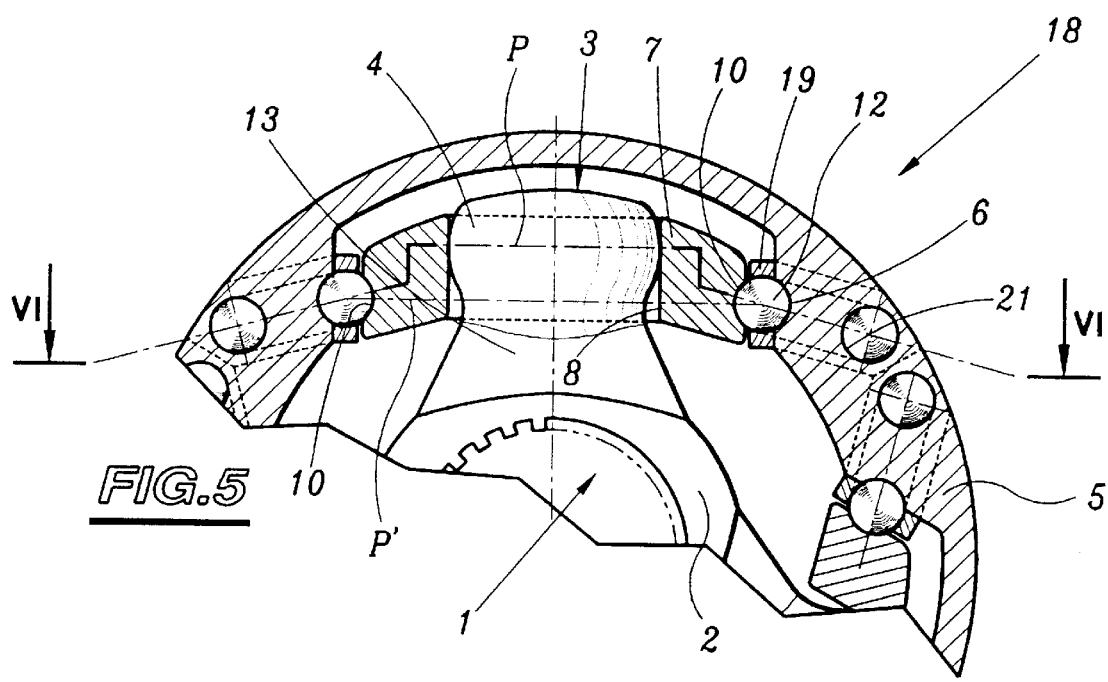
FIG. 5 is a view of a third embodiment of the constant velocity joint of the invention in cross-section taken along the line V—V in FIG. 6.
Figure 6:
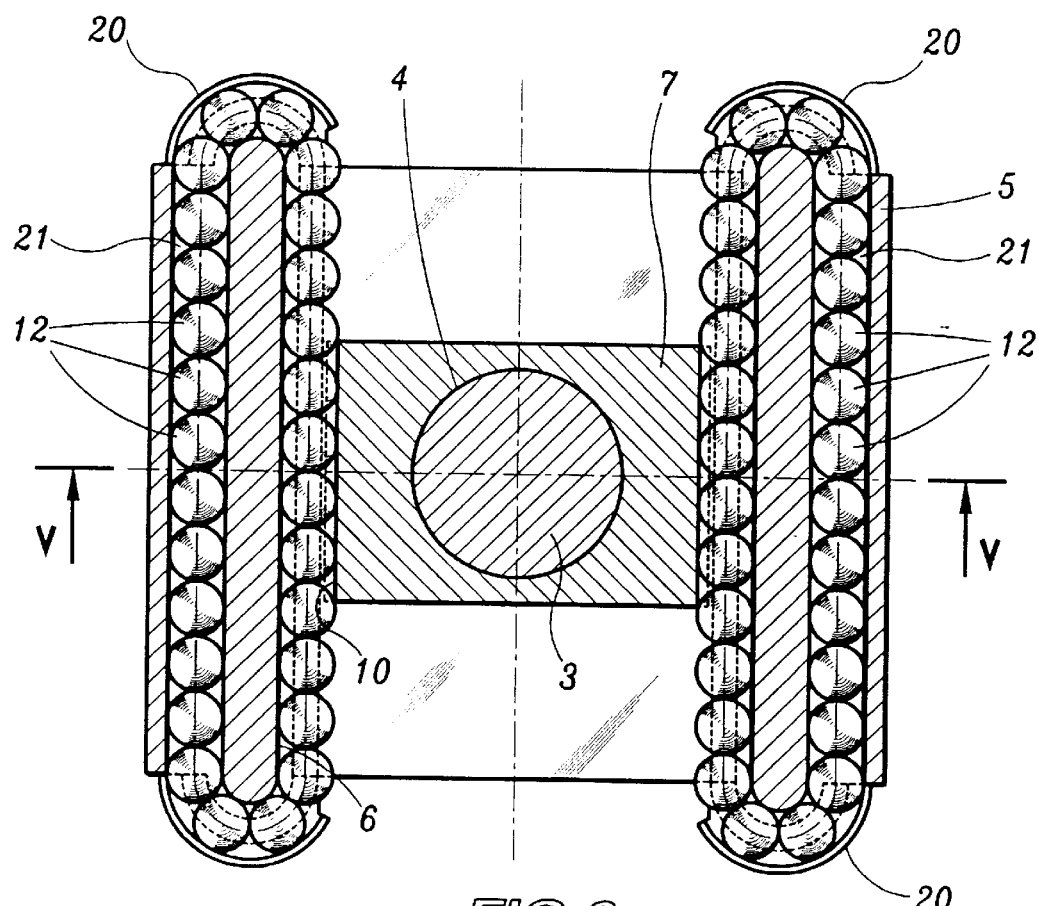
FIG. 6 is a view in section taken along the broken line VI—VI in FIG. 5.

The constant velocity joint shown in FIGS. 5 and 6 differs from that of FIGS. 1 and 2 in the following respects.

The shoe 7 has a domed shape of substantially cylindrical section with a constant thickness of the same order of magnitude as in FIGS. 1 and 2. This shape allows it to cooperate via the bore 8 with the spherical bearing surface 4 in the plane P and to provide tracks 10 for the balls 12 in the plane P of significantly smaller diameter than FIGS. 1 and 2. As in FIGS. 3 and 4, the domed shape considerably strengthens the base 13 of the arms 3.

Moreover, the ridges 11 at the ends are eliminated and a conventional device 18 for recirculating the balls is provided on each side of each arm, including a cage 19 for the balls between the shoe and the track 6, two curved end guides 20 and a bore 21 in the female member 5. The devices 18 are described in detail in the previously mentioned DE-A-40 24 534.

Figure 7:
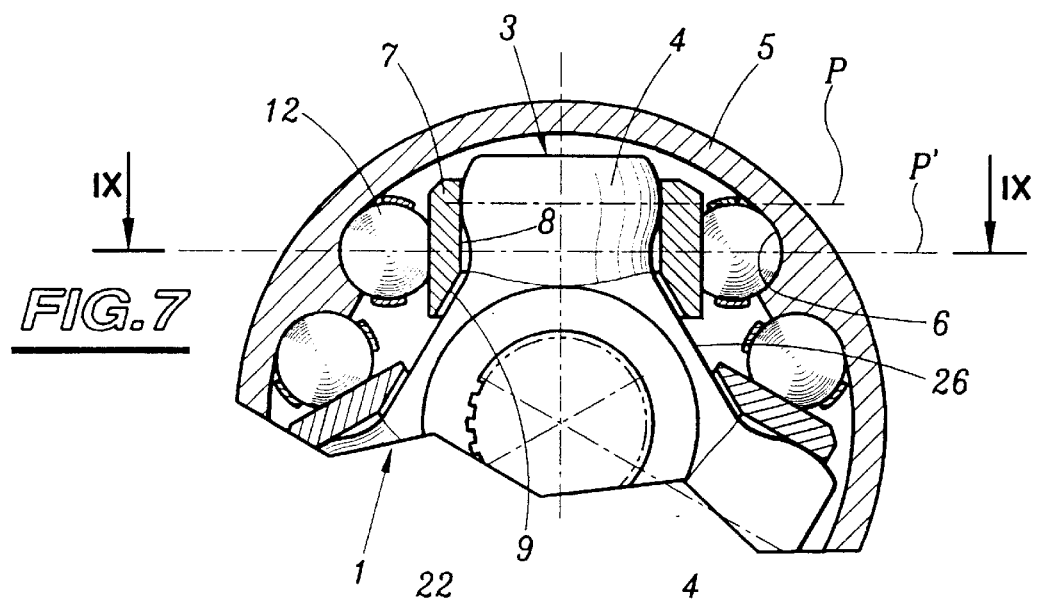
FIGS. 7 and 8 are views of a fourth embodiment of the constant velocity joint of the invention taken along the lines VII—VII and VIII—VIII respectively, in FIG. 9.
Figure 8:
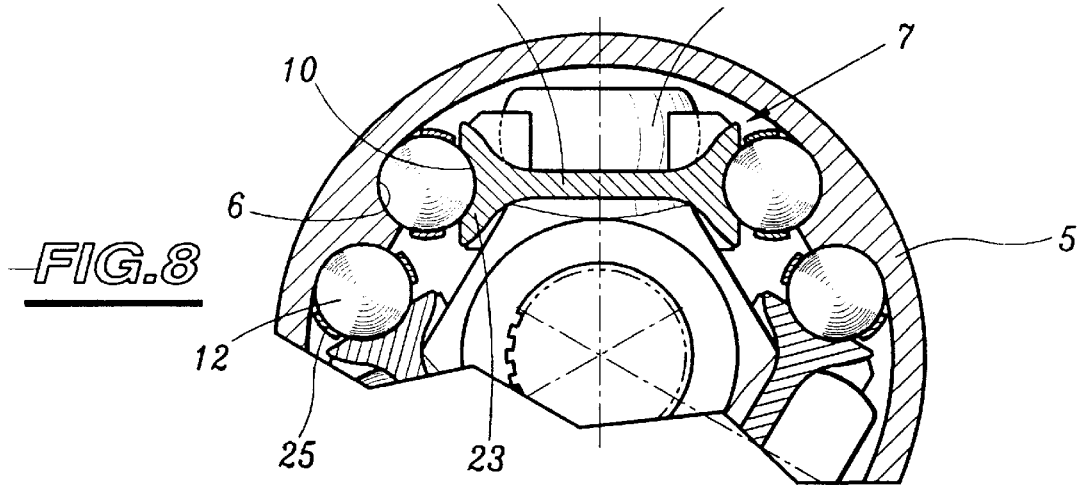
Figure 9:
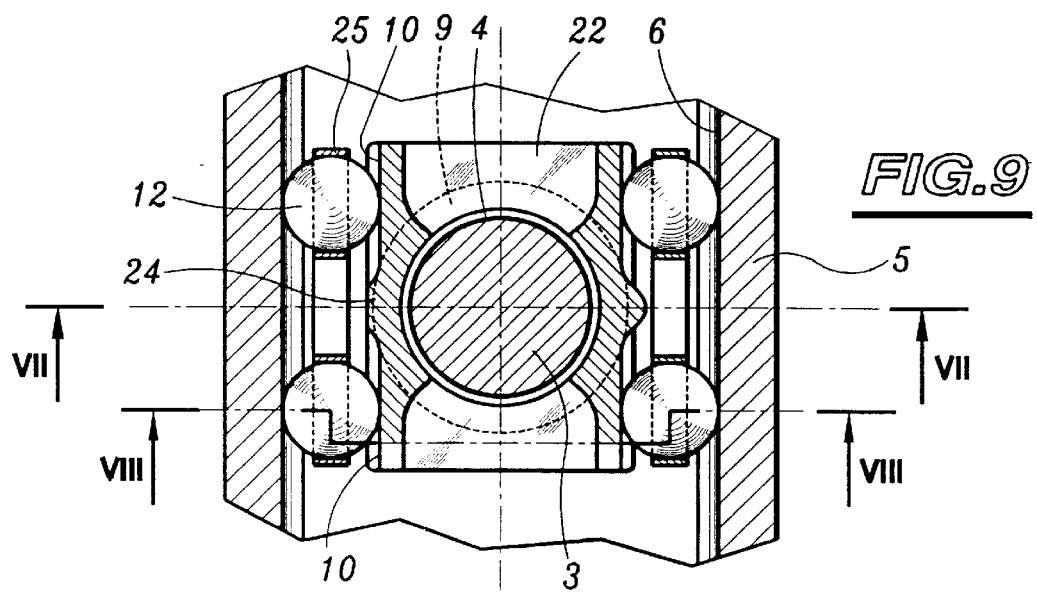
FIG. 9 is a view in section taken along the line IX—IX in FIG. 7 or FIG. 8.

The constant velocity joint shown in FIGS. 7 to 9 differs from that from FIGS. 1 and 2 in the shape of the shoe 7. The shoe defines a thin median web 22, contained in the plane P', which carries a trough 23 on each side. The latter form two rolling tracks 10 aligned with each other, separated by a ridge 24 at mid-length. Consequently, the two balls of each row are retained by a cage 25.

In this embodiment the bevel 9 can have a wide flare because it is in the region of the ridges 24 and does not interfere with the tracks 10 even if, as seen in plan view (FIG. 9), its contour is outside the bottom of the tracks. Furthermore, to strengthen further the region of the bevel 9 and to provide an improved abutment for the balls, the ridges 24 can project beyond the edge of the tracks 10, as shown in the righthand part of FIGS. 7 and 9.

As can be seen in FIG. 7, in this embodiment this clearance possibility is exploited in that the inner ends of the adjacent spherical bearing surfaces 4 are linked by a straight line segment 26 when seen in cross-section.

Figure 10:
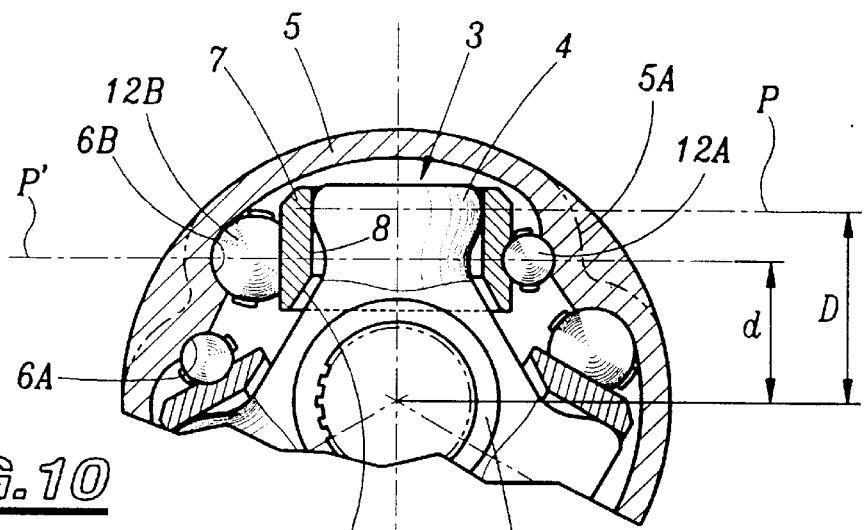
FIGS. 10 through 12 are views analogous to FIG. 7 of three respective variants of the embodiments from FIGS. 7 through 9.

FIG. 10 shows a variant of the joint from FIGS. 7 through 9 in which the torque transmission capacity is low in one rotation direction, namely that corresponding to reverse motion of the vehicle. To achieve this the balls 12A corresponding to this direction are significantly smaller than the other balls 12B. The radius of their tracks 6A is correspondingly small relative to that of the other tracks 6B. The plane P' is the median plane of all the balls 12A and 12B.

This variant lightens the joint not only by reducing the total weight of the balls but also by hollowing out the outside profile of the tulip 5 in the region of the balls 12A, as shown at 5A.

The following two developments can then be considered.

Figure 11:
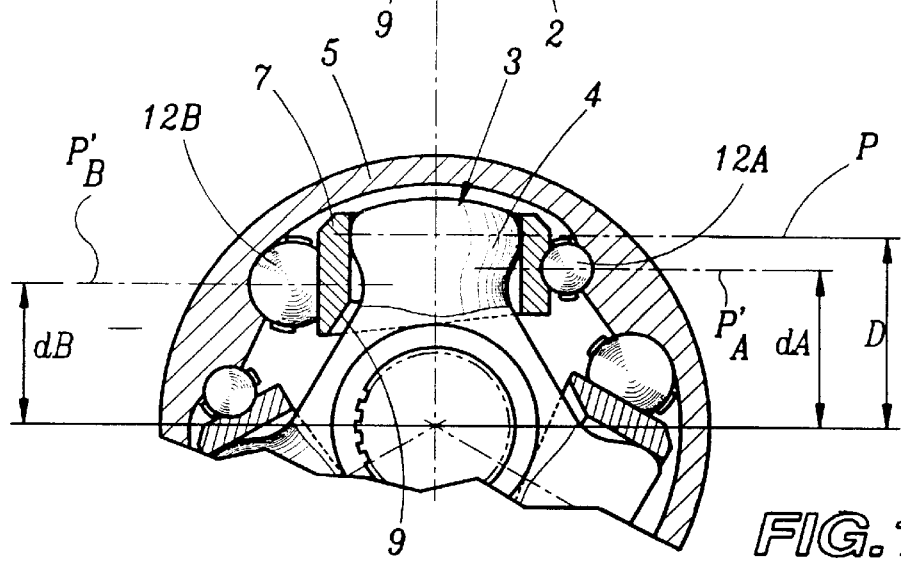

In FIG. 11, the median plane P'A of the small balls 12A is offset outwards to a location between the plane P and the median plane P'B of the balls 12. This increases the lever arm $d_A$ of the balls 12A and therefore their torque transmission capacity. The radially inner part of the shoe 7 can then be truncated obliquely, as shown here.

Figure 12:
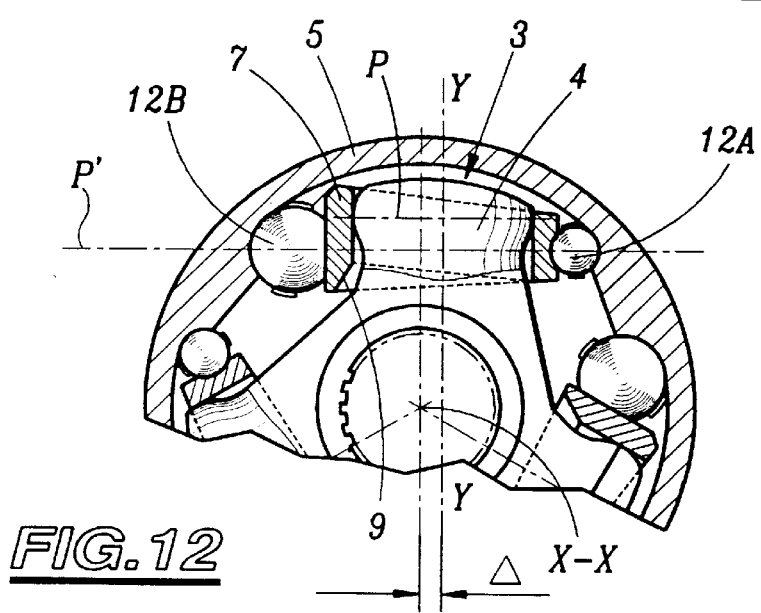

In the FIG. 12 variant, the saving in space resulting from the reduction in the diameter of the balls 12A is exploited to offset the axis Y—Y of the arm a distance towards the small balls 12A, relative to the central position passing through the main axis X—X of the joint of the other embodiments. The outer and inner parts of the shoe are then cut off obliquely. The effect of an offset of the above kind is to increase the torque transmission capacity of the joint for a given overall size of the tulip, as explained in application FR-A-2 730 773.

What is claimed is:

1. A tripod sliding constant velocity joint comprising:
   a male member (1) having ternary symmetry about a first main axis (X—X) and including a hub (2) from which project three arms (3) that each delimit a spherical bearing surface (2);
   a female member (5) defining three pairs of rolling tracks (6) and having ternary symmetry about a second main axis (X'—X'); and
   for each arm:
   a one-piece intermediate shoe (7) incorporating a cylindrical bore (8) that cooperates with the spherical bearing surface (4) and has two opposed rolling tracks (10), and
   two series of rolling members (12) each of which rolls on a rolling track (6) of the female member (5) and on a rolling track (10) of the shoe, wherein the bearing distance (D) between the center (A) of the spherical bearing surface (4) of each arm (3) and the first main axis (X—X) is significantly different, for each rotation direction of the joint, from the rolling distance (d;$d_A d_B$) between the first main axis (X—X) and the mean plane (P';$P'_A P'_B$) of the rolling members (12;$12_A$,$12_B$) associated with the same arm and transmitting torque in the direction concerned so that in operation the two series of rolling members (12) are loaded regardless of the direction of the applied torque even when the joint is aligned.

2. A constant velocity joint according to claim 1, wherein the bearing distance (D) is significantly greater than the rolling distance (d; $d_A$, $d_B$).

3. A constant velocity joint according to claim 2 wherein the part of the intermediate shoe (7) near said first main axis (X—X) has a bore clearance, in particular a bevel, receiving the radially inner part (13) of the associated arm (3).

4. A constant velocity joint according to claim 4 wherein the ratio of the rolling distance (d; $d_A$, $d_B$) to the bearing distance (D) is between approximately 0.7 and approximately 0.92.

5. A constant velocity joint as claimed in claim 3 wherein the shoe (7) has, on each side, two rolling tracks (10) aligned with each other and separated by a ridge (24) integral with the shoe and in that the bore clearance (9) is in line with the ridge.

6. A constant velocity joint as claimed in claim 3, wherein, as seen in cross section through the male member (1), the profile of each arm (3) extends substantially in a straight line from the radially inner end of the spherical bearing surface (4) and merges substantially tangentially with the outside surface of the hub (2).

7. A constant velocity joint as claimed in claim 5 wherein, as seen in cross-section through the male member (1), the profile of each arm (3) extends substantially in a straight line from the radially inner end of the spherical bearing surface (4) and merges substantially tangentially with the outside surface of the hub (2).

8. A constant velocity joint according to claim 3 wherein, as seen in cross-section through the male member (1), the radially inner ends of the adjacent spherical bearing surfaces (4) are substantially joined by a straight line segment (26).

9. A constant velocity joint according to claim 5 wherein, as seen in cross-section through the male member (1), the radially inner ends of the adjacent spherical bearing surfaces (4) are substantially joined by a straight line segment (26).

10. A constant velocity joint according to claim 1 wherein the shoe (7) has a domed shape from its cylindrical bore (8) to its rolling tracks (10).

11. A constant velocity joint as claimed in claim 1 wherein the shoe (7) is formed by a generally domed plate having a pair of opposite longitudinal edges (14) bent to a position in the corresponding rolling plane (P').

12. A constant velocity joint according to claim 1 wherein the rolling members (12A) on a first side of each arm (3) have a forced transmission capacity less than that of the opposite rolling members (12B) and in particular are rolling members (12A) of smaller diameter than the opposite rolling members (12B).

13. A constant velocity joint according to claim 12 wherein a rolling plane (P'A) of the rolling members (12A) on said first side is a greater distance from said main axis (X—X) than a rolling plane (P'B) of the opposite rolling members (12B).

14. A constant velocity joint according to claim 12 wherein an axis (Y—Y) of each arm (3) is offset towards said first side relative to a position of an axis passing through said first main axis (X—X).

15. A constant velocity joint according to claim 13, wherein an axis (Y—Y) of each arm (3) is offset toward said first side relative to a position of an axis passing through said first main axis (X—X).

* * * * *